(12) United States Patent
Claggett et al.

(10) Patent No.: US 9,297,326 B2
(45) Date of Patent: Mar. 29, 2016

(54) HEALTH-ADAPTIVE REACTION CONTROL SYSTEM

(71) Applicant: The Boeing Company, Chicago, IL (US)

(72) Inventors: Teresa Anne Claggett, Seattle, WA (US); Darin William Brekke, Fox Island, WA (US); Richard Donovan Jones, Issaquah, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/710,057

(22) Filed: May 12, 2015

(65) Prior Publication Data

US 2015/0239582 A1    Aug. 27, 2015

Related U.S. Application Data

(62) Division of application No. 12/501,292, filed on Jul. 10, 2009, now Pat. No. 9,115,662.

(51) Int. Cl.
| | |
|---|---|
| *G06F 11/30* | (2006.01) |
| *G06F 19/00* | (2011.01) |
| *F02D 41/22* | (2006.01) |
| *G06F 11/00* | (2006.01) |
| *G05D 1/08* | (2006.01) |
| *B64G 1/26* | (2006.01) |
| *B64G 1/24* | (2006.01) |
| *B64G 1/28* | (2006.01) |
| *B64G 1/36* | (2006.01) |

(52) U.S. Cl.
CPC .............. *F02D 41/22* (2013.01); *F02D 41/221* (2013.01); *G05D 1/0883* (2013.01); *G06F 11/00* (2013.01); *B64G 1/26* (2013.01); *B64G 1/288* (2013.01); *B64G 1/36* (2013.01); *B64G 2001/245* (2013.01); *F02D 2200/701* (2013.01)

(58) Field of Classification Search
CPC ......... G06F 11/00; G06F 11/30; F02D 41/22; F02D 41/221
USPC ............... 701/3, 8, 21, 29.1, 29.2, 31.7–32.1, 701/32.3, 32.9, 33.5, 33.7–34.1, 34.3, 34.4; 702/182–185; 244/194
See application file for complete search history.

(56) References Cited

U.S. PATENT DOCUMENTS

| | | |
|---|---|---|
| 3,866,025 A | 2/1975 | Cavanagh |
| 5,130,931 A | 7/1992 | Paluszek et al. |

(Continued)

OTHER PUBLICATIONS

Claggett et al., "Health-Adaptive Reaction Control System," U.S. Appl. No. 12/501,292, filed Jul. 10, 2009, 56 pages.

(Continued)

*Primary Examiner* — Jack W Keith
*Assistant Examiner* — Chuong P Nguyen
(74) *Attorney, Agent, or Firm* — Yee & Associates, P.C.

(57) ABSTRACT

Methods and apparatuses are provided for managing a state of a platform. The methods and apparatuses comprise receiving a desired state for the platform. The methods and apparatuses comprise receiving the state of the platform. The methods and apparatuses comprise selecting a combination of thrusters from a plurality of thrusters to operate. The combination of thrusters is selected to adjust the state of the platform to the desired state. The methods and apparatuses operate the combination of thrusters to adjust the state of the platform to the desired state.

22 Claims, 6 Drawing Sheets

(56) References Cited

U.S. PATENT DOCUMENTS

| | | | |
|---|---|---|---|
| 5,140,525 | A | 8/1992 | Shankar et al. |
| 5,311,435 | A | 5/1994 | Yocum et al. |
| 5,335,179 | A | 8/1994 | Boka et al. |
| 5,452,869 | A | 9/1995 | Basuthakur et al. |
| 6,208,915 | B1 * | 3/2001 | Schutte et al. ............. 701/13 |
| 6,477,450 | B2 | 11/2002 | Rodden et al. |
| 6,814,330 | B2 | 11/2004 | Jones et al. |
| 7,255,306 | B2 * | 8/2007 | Jones et al. ............. 244/76 R |
| 7,280,941 | B2 | 10/2007 | Bonanni et al. |
| 7,860,635 | B2 | 12/2010 | Litt |
| 2002/0193920 | A1 | 12/2002 | Miller et al. |
| 2004/0176887 | A1 * | 9/2004 | Kent et al. ............. 701/30 |
| 2005/0080522 | A1 * | 4/2005 | Hamamatsu et al. ........ 701/21 |
| 2005/0119803 | A1 | 6/2005 | Zentgraf |
| 2005/0143873 | A1 | 6/2005 | Wilson |
| 2005/0178922 | A1 * | 8/2005 | Jones et al. ............. 244/195 |
| 2007/0260424 | A1 * | 11/2007 | Brown et al. ............. 702/182 |
| 2011/0082604 | A1 | 4/2011 | Lam |
| 2012/0053780 | A1 | 3/2012 | Park et al. |

OTHER PUBLICATIONS

Office Action, dated Sep. 28, 2012, regarding U.S. Appl. No. 12/501,292, 13 pages.

Final Office Action, dated May 24, 2013, regarding U.S. Appl. No. 12/501,292, 12 pages.

Office Action, dated Aug. 28, 2014, regarding U.S. Appl. No. 12/501,292, 17 pages.

Notice of Allowance, dated Jan. 22, 2015, regarding U.S. Appl. No. 12/501,292, 8 pages.

Jones, "Development of an Adaptive Pulse Modulator", Proceedings of the Third International Conferernce on Advances in Communication and Control Systems (COMCON3), Oct. 1991, pp. 1-14.

Hattis et al., "Qualitative Differences Between On-Orbit and Transition RCS Control", American Institute of Aeronautics and Astronautics, Inc. 1982, 82-1577, pp. 437-442.

Bergmann et al., "Accommodation of Practical Constraints by a Linear Programming Jet Select", American Institute of Aeronautics and Astronautics, Inc. 1983, 83-2209, pp. 346-351.

Paradiso, "A Highly Adaptable Method of Managing Jets and Aerosurfaces for Control of Aerospace Vehicles", Journal of Guidance, Control, and Dynamics, vol. 14, No. 1, Jan.-Feb. 1991, pp. 44-50.

Doman, "Quantized Control Allocation of Reaction Control Jets and Aerodynamic Control Surfaces", Journal of Guidance, Control and Dynamics, vol. 14, No. 1, Jan.-Feb. 2009, pp. 13-24.

* cited by examiner

HEALTH-ADAPTIVE REACTION CONTROL SYSTEM

This application is a divisional of U.S. patent application Ser. No. 12/501,292, filed Jul. 10, 2009.

BACKGROUND INFORMATION

1. Field

The present disclosure relates generally to vehicle control, and in particular, to operating vehicle Reaction Control System (RCS) thrusters. Still, more particularly, the present disclosure relates to a method and apparatus for autonomously adapting to vehicle and thruster uncertainties and to thruster failures. In addition, the present disclosure relates to a method and apparatus for using prognostic and diagnostic information about thruster health to extend the life of the vehicle.

2. Background

Orienting and maneuvering a space vehicle is accomplished by a vehicle control subsystem. Current spacecraft Reaction Control Systems (RCS) generally use single axis switching curve logic to command thruster firings for attitude control. For each axis, the attitude and rate errors are compared to pre-defined switching curves that were designed based on predicted vehicle properties, mission requirements, and maneuver propellant budgets. If the current status of the errors is outside of the dead-zones defined by the switching curves, the system will operate the thrusters. If the current status of the errors is inside the dead-zones, the system will leave the thrusters off and coast. When using this system, translational control is done separately using pre-computed or guidance generated on-time commands. An "on-time" command is the amount of time a thruster is operated. A problem with this single axis approach is that cross-axis coupling can produce disturbances in the other axes and translational and rotational coupling will generate cross disturbances between the control laws. Another problem with this method is the switching curves can become quite complex and highly tuned for a specific mission.

When the control system determines a desired vehicle response, the system will look up an appropriate thruster combination from a pre-calculated table. The table may be made of different combinations for certain groups of thrusters. For example, the table may comprise many combinations of ways to operate groups of three thrusters at one time. A problem with this thruster selection method is that the number of thrusters capable of being used at a single time is limited to the combinations in the table, which are usually a certain number less than all possible combinations.

Some systems use linear control laws in conjunction with a linear programming based thruster selection algorithm. These algorithms typically minimize propellant consumption while constraining errors. These methods often generate a thruster on-time command. A problem with these algorithms is that they are generally iterative, with an unknown number of iterations required to converge to an acceptable solution, and therefore, can be computationally intensive. It is often necessary to limit the number of thrusters that can be used to reduce the computational load. These techniques are sometimes used in combination with pre-computed thruster selection tables for various mission phases and contingencies.

Current systems typically cannot adapt to unexpected changes in mass properties or thruster dispersions. When unforeseen events do occur, many implementations of these algorithms are constrained to use a subset of all the available thrusters and are not optimized to use thrusters of different types.

Thus, it would be advantageous to have a method and apparatus that takes into account at least some of the issues discussed above, as well as possibly other issues.

SUMMARY

In one advantageous embodiment, a method is provided for managing a plurality of thrusters in a platform. The method comprises operating the plurality of thrusters in the platform with a thruster control system. The method also comprises estimating a vehicle response resulting from the operation of the plurality of thrusters to form an estimated vehicle response. The method also comprises comparing the estimated vehicle response to a desired vehicle response to develop objective function errors. Also, the method comprises developing a number of commands configured to correct the objective function errors.

In another advantageous embodiment, a method is provided for controlling a state of a platform. The method comprises receiving a desired state for the platform. The method receives a state of the platform. The method comprises selecting a combination of thrusters from a plurality of thrusters to operate, the combination of thrusters selected to adjust the state of the platform to the desired state. Also, the method comprises operating the combination of thrusters to adjust the state of the platform to the desired state.

In another advantageous embodiment, a method is provided for maintaining a number of health parameters in a platform. The method comprises operating a plurality of thrusters in the platform with a thruster control system. The method also comprises developing a number of commands, the number of commands configured to maintain a number of health parameters for the platform within a desired level using health data. Also, the method comprises executing the number of commands by a thruster control system.

In another advantageous embodiment, an apparatus is provided. The apparatus comprises a thruster control system. The apparatus also comprises a processor unit configured to operate the plurality of thrusters in the platform with a thruster control system; estimate a vehicle response resulting from the operation of the plurality of thrusters to form an estimated vehicle response; compare the estimated vehicle response to a desired vehicle response to develop objective function errors; and develop a number of commands configured to correct the objective function errors.

In another advantageous embodiment, an apparatus is provided. The apparatus comprises a thruster control system. The apparatus also comprises a processor unit configured to receive a desired state for the platform; receive a state of the platform; select a combination of thrusters from a plurality of thrusters to operate, the combination of thrusters selected to adjust the state of the platform to the desired state; and operate the combination of thrusters to adjust the state of the platform to the desired state.

In another advantageous embodiment, an apparatus is provided. The apparatus comprises a thruster control system. The apparatus also comprises a processor unit configured to operate a plurality of thrusters in the platform with a thruster control system; develop a number of commands, the number of commands configured to maintain a number of health parameters for the platform within a desired level using health data; and execute the number of commands by a thruster control system.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

The different advantageous embodiments recognize and take into account a number of considerations. For example, the different advantageous embodiments recognize and take into account that current thruster control systems usually only handle one axis at a time and multiple axis systems do not perform very well. Rotations and translations are not often controlled simultaneously, generating disturbances between the two systems.

Further, the different advantageous embodiments also recognize that the algorithms may be constrained to use a subset of all available thrusters. These algorithms also may be used to make pre-existing contingency tables. During operation, when a condition occurs, the table is consulted to determine a proper thruster configuration. Sometimes, the condition is not provided for in the table which creates a time consuming process at the operating station to determine the right thruster configuration. As a result, the error of the attitude of the vehicle may change and become greater. Pre-existing tables are not usually made for combinations of different types of thruster.

Thus, the different advantageous methods and apparatuses are provided for managing a plurality of thrusters in a platform. The method and apparatuses comprise operating the plurality of thrusters in the platform with a thruster control system. The methods and apparatuses comprise estimating a vehicle response resulting from the operation of the plurality of thrusters to form an estimated vehicle response. The methods and apparatuses also comprise comparing the estimated vehicle response to a desired vehicle response to develop objective function errors. Also, the methods and apparatuses comprise developing a number of commands configured to correct the objective function errors.

In another advantageous embodiment, a method and apparatus is provided for controlling a state of a platform. The method and apparatus comprises receiving a desired state for the platform. The method receives a state of the platform. The method and apparatus comprises selecting a combination of thrusters from a plurality of thrusters to operate, the combination of thrusters selected to adjust the state of the platform to the desired state. Also, the method and apparatus comprises operating the combination of thrusters to adjust the state of the platform to the desired state.

In another advantageous embodiment, a method and apparatus is provided for maintaining a number of health parameters in a platform. The method and apparatus comprises operating a plurality of thrusters in the platform with a thruster control system. The method and apparatus also comprises developing a number of commands, the number of commands configured to maintain a number of health parameters for the platform within a desired level using health data. Also, the method and apparatus comprises executing the number of commands by a thruster control system.

Figure 1:
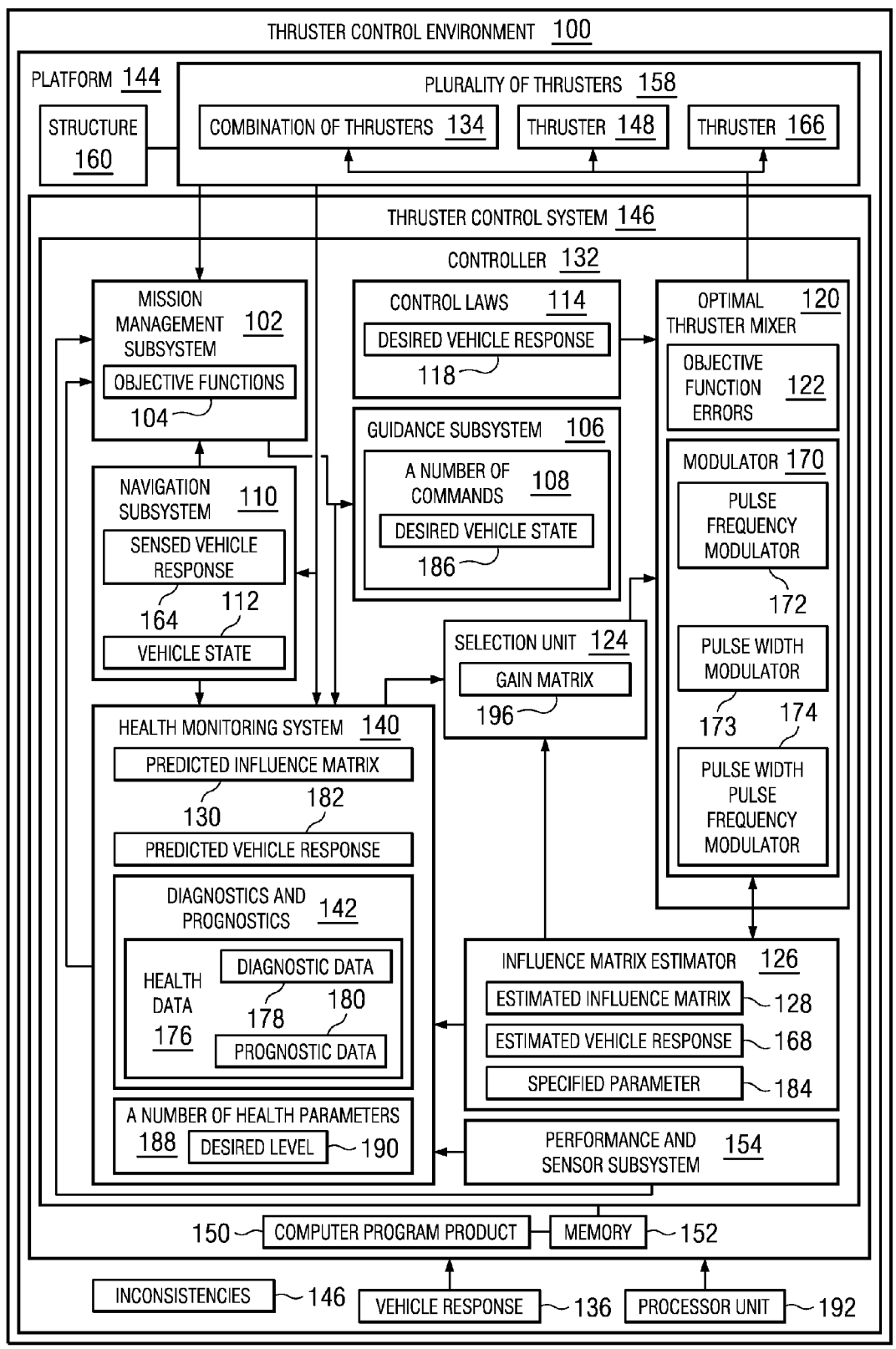
FIG. 1 is an illustration of a block diagram of a thruster control environment depicted in accordance with an advantageous embodiment.

Turning now to FIG. 1, a block diagram of a thruster control environment is depicted in accordance with an advantageous embodiment.

Figure 8:
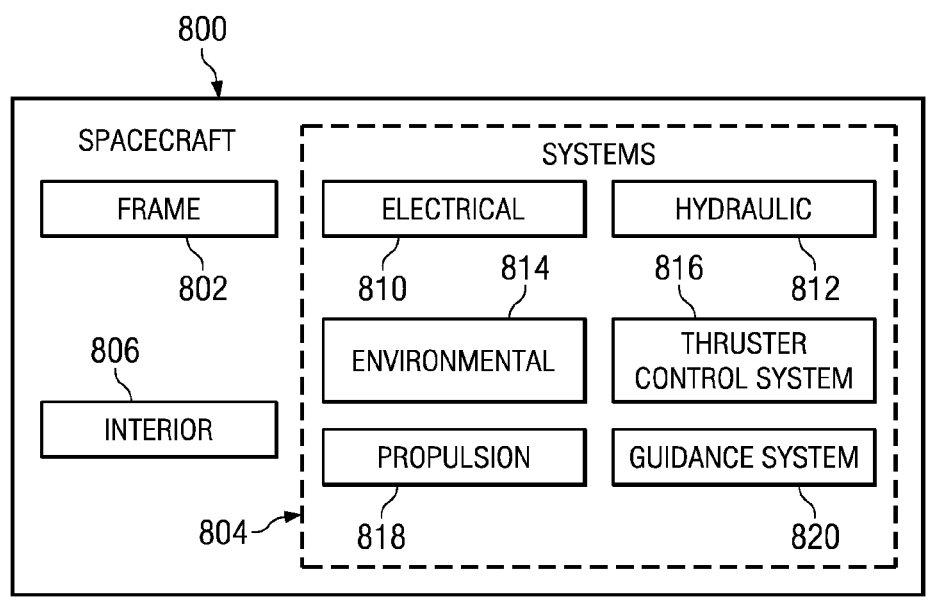
FIG. 8 is an illustration of a spacecraft in which an advantageous embodiment may be implemented.

In a number of advantageous embodiments, thruster control environment 100 may comprise platform 144 and thruster control system 146. Thruster control system 146 may be an implementation of thruster control system 816, as shown in FIG. 8. Thruster control system 146 comprises controller 132. Thruster control environment 100 may also comprise processor unit 192. Processor unit 192 may process commands and instructions from thruster control system 100.

Thruster control system 146 may be a reaction control system. In this advantageous embodiment, platform 144 may be any type of object comprising thrusters. Platform 144 may be a spacecraft. Platform 144 may be an implementation of frame 802, as shown in FIG. 8. Platform 144 may take different forms in different advantageous embodiments, such as, for example, a satellite, shuttle, rocket, and/or planetary lander. Platform 144 may also be an underwater vehicle such as a submarine or any other type of platform with thrusters below and/or above water. Platform 144 may comprise a plurality of thrusters 158, vehicle response 136, structure 160, vehicle state 112, and inconsistencies 146. In a number of advantageous embodiments, plurality of thrusters 158 is one example of one implementation of a thruster system such as, for example, thruster system 816 as shown in FIG. 8.

Plurality of thrusters 158 may comprise any number of thrusters. As used herein, a number referring to items means one or more items. For example, a number of thrusters is one or more thrusters. Each thruster of plurality of thrusters 158 may be various sizes, locations, and orientations configured on platform 144.

Vehicle response 136 may result from forces and torques acting upon platform 144. Vehicle response 136 may be caused by, but not limited to, thrusters, such as plurality of thrusters 158, other controllers, debris, appendage motion, environmental disturbances, and/or gravitational forces.

Structure 160 may be the physical structure of platform 144. Structure 160 may be associated with plurality of thrusters 158. A first component may be considered to be associated with a second component by being secured to the second component, bonded to the second component, fastened to the second component, and/or connected to the second component in some other suitable manner. The first component may also be considered to be associated with the second component by being formed as part of, and/or an extension of, the second component. Structure 160 may also be associated with thruster control system 146. Thruster control system 146 may determine estimated vehicle response 168 and predicted vehicle responses 182. Predicted vehicle response 182 is a prediction of vehicle movement based on thruster firings and a priori vehicle configuration data. The term "a priori" means prior knowledge about a subject. Estimated vehicle response 168 is an estimate of vehicle response 136 which is an actual vehicle response based on known thruster response delays, thruster firings, and sensed vehicle response 164.

Vehicle state 112 may comprise attitude, attitude rates, positions, velocities, angular accelerations, and linear accelerations. Attitude as used herein refers to the orientation and/or position of an object, such as platform 144. In referencing changes to attitude and position, the terms roll, pitch, and yaw are used to denote rotations about a defined set of axes. Translations are referenced with regard to the x, y, and z directions of the axes. The axes, such as the x, y, and z axes are perpendicular to each other in a three dimensional space.

In this advantageous embodiment, plurality of thrusters 158 may be thrusters for controlling vehicle attitude, attitude rates, and angular accelerations of platform 144. In other advantageous embodiments, plurality of thrusters 158 may be used to control vehicle position, velocity, and linear acceleration for use in a propulsion system of platform 144, such as propulsion system 818 as shown in FIG. 8. Plurality of thrusters 144 may comprise thruster 148 and combination of thrusters 134.

In one advantageous embodiment, thruster control system 146 is a system for controlling plurality of thrusters 158. Thruster control system 146 may control plurality of thrusters 158 to carry out a number of commands 108 to reach a desired vehicle state 186. A number of commands 108 may be any number of commands. In this illustrative example, thruster control system 146 comprises controller 132, memory 152, computer program product 150, and other suitable components. In other advantageous embodiments, instructions used in thruster control system 146 may be located in computer program product 150. In some advantageous embodiments thruster control system 146 may be located on platform 144. In other advantageous embodiments, thruster control system 146 may be located in a separate location, such as, but not limited to, a ground station, submarine, aircraft, space station, and/or a space shuttle. Thruster control system 146 controls the operation of plurality of thrusters 158.

In this advantageous embodiment, controller 132 comprises mission management subsystem 102, guidance subsystem 106, control laws 114, health monitoring subsystem 140, optimal thruster mixer 120, and influence matrix estimator 126. The different components of controller 132 form a feedback loop. Guidance subsystem 106 may be an example of guidance system 820 as shown in FIG. 8 or some other guidance system. Navigation subsystem 110 measures vehicle response with sensors and updates vehicle state 112. Controller 132 controls the operation of plurality of thrusters 158.

Forces and torques acting upon a spacecraft causing vehicle response 136 may be caused by, but not limited to, thrusters, such as a combination of thrusters 134. Combination of thrusters 134 may include any number of thrusters of plurality of thrusters 158 including all or none. Forces and torques may also be due to other control subsystem components such as engine firings and vectoring, momentum systems, magnetic torque systems, moving appendages, environmental disturbances and gravity. Forces and torques may cause platform 144 to translate in different axes and/or to rotate about the axes. Attitude as used herein refers to the angular orientation of the vehicle body-axes to a defined reference frame. The vehicle body-axes refer to three perpendicular axes that are fixed to the vehicle. The attitude is also part of vehicle state 112.

Mission management subsystem 102 coordinates data from all the other subsystems, provides maneuver and event sequencing for the mission, and includes the capability to uplink information from the ground station. Mission management subsystem 102 may comprise pre-computed event sequences and corresponding configuration updates. The configuration updates may comprise parameter schedules for control laws 114 gains and for objective functions 104 and their corresponding weighting matrices. Objective functions 104 may be comprised of rotational acceleration commands, translational acceleration commands, propellant usage limits, structural mode excitation limits, any other function that varies with thruster firing, or a combination of objective functions 104. In different advantageous embodiments, parameter schedules may include thruster weighting gains, thruster inhibits, thruster minimum on-times, and/or pulse-width pulse-frequency (PWPF) modulator 174 parameters. The configuration updates may also include mission plans for known contingency scenarios. For example, mission management could schedule a mission abort, a safe-haven maneuver, or a guidance retarget based on vehicle health or navigation data.

Guidance subsystem 106 generates a number of commands 108. A number of commands 108 may comprise desired state 186, such as a trajectory and/or a desired vehicle attitude orientation. A number of commands 108 may be in the form of pre-computed tables or the commands may be computed during flight using current navigation data and vehicle mass property estimates to reconfigure the trajectory based on propellant usage and accuracy requirements. With computing the commands during flight, guidance subsystem 106 may also re-configure based on health data, as well as other data. A number of commands 108 may comprise of position, attitude, angular rate, velocity, angular acceleration, and/or translational acceleration commands.

Navigation subsystems 110 comprises measurement sensors and software. The measurement sensors and software determine vehicle state 112, such as the current vehicle angular accelerations, translational accelerations, vehicle angular velocities, translational velocities, vehicle attitude, and/or vehicle position. In different advantageous embodiments, to determine vehicle state 112, navigation subsystem 110 may include an Inertial Measurement Unit (IMU) which comprises an array of accelerometers and an array of rate gyros. The translational accelerations are measured directly by the accelerometers but angular accelerations are often derived by computing finite differences between sequential rate gyro attitude rate data. Vehicle state 112 may be filtered for noise and/or to attenuate structural mode effects. Algorithms process navigation data to update vehicle state 112 consisting of vehicle velocities, position, and attitude.

Control laws 114 subtract vehicle state 112 from a desired vehicle response 118 to produce objective function errors 122. Objective function errors 122 may comprise of rotational, translational, attitude, position, attitude rate, and velocity errors. Control laws 114 place linear gains on objective function errors 122 to generate a desired vehicle response 118 to send to optimal thruster mixer 120. Desired vehicle response 118 may be comprised of angular and linear acceleration commands as well as other commands. In different advantageous embodiments, control laws 114 comprises a linear control system to generate desired vehicle response 118 to send to optimal thruster mixer 120. A number of advantageous embodiments provide standard linear control system design and stability analysis tools to be used for non-linear thruster control. For example, desired vehicle response 118 can be generated with a Proportional, Integral, and Derivative (PID) control law structure. A Proportional, Integral, and Derivative (PID) control law structure may place gains on the attitude and position errors, the integral of the errors, and on the attitude rate and velocity errors. Gains may also be placed on desired vehicle response 118 for feed-forward capability. Feed-forward provides the capability to pass desired vehicle response 118 directly to optimal thruster mixer 120 without the delays associated with integrations for state errors. The gains may be designed using an automated linear control system design tool and method.

Optimal thruster mixer 120 may convert desired vehicle response 118 received from control laws 114 into valve commands. Valve commands may comprise commands to valves on each thruster to fire or stop firing a thruster. Optimal thruster mixer 120 may incorporate modulator 170, such as pulse-width pulse-frequency (PWPF) modulator 174 with an optimal regulator implementation. Modulator 170 may also be pulse-frequency modulator 172 or pulse-width modulator 173. Pulse-width pulse-frequency modulator 174 converts the regulator output into a sequence of valve commands that, when integrated over a short period of time relative to the system dynamics, will result in platform 144 following desired vehicle response 118 in a weighted, constrained, least squares error manner. The least squares error may also be referred to as the P2-norm, L2-norm, or Euclidean norm. In different advantageous embodiments, other types of norms may be used to calculate the valve commands. The different advantageous embodiments recognize that optimal thruster mixer 120 requires relatively low computational throughput and provides multi-axis thruster selection for a plurality of thrusters 158. The different advantageous embodiments provide that with P2-norm optimization, used in conjunction with the pulse-width pulse-frequency modulator 174, an on-off thruster control can be treated as a linear system.

An on-off sequence of operation is the times in which each thruster 148 and 166 will be operated. For example, thruster 148 may be operated in short 1 second "on" then 1 second "off" pulses over a period of 1 minute. During this time, thruster 166 may also be operating, but thruster 166 may be "on" during the entire 1 minute. "Operated" as used herein may also mean "fire." For example, thruster 148 may be fired. When thruster 148 is "operated", "fired", or "firings", thruster 148 produces a force against the object, such as platform 144.

Selection unit 124 allows optimal thruster mixer 120 to select estimated influence matrix 128 or predicted influence matrix 130 to use in optimal thruster mixer 120. In selection unit 124 where the optimal thruster mixer 120 can adapt to vehicle and thruster dispersions and to thruster failures, gain matrix 196 is set equal to the estimated influence matrix 128. If the quality of estimated influence matrix 128 becomes invalid, predicted influence matrix 130 is used as gain matrix 196. Gain matrix 196 may also be set to a previous valid estimated influence matrix 128 when a current estimated influence matrix 128 is not valid. Estimated influence matrix 128 is invalid when root mean square errors between estimated accelerations and measured accelerations exceed specified parameter 184. Specified parameter 184 may be previously set or set by thruster control system 146.

Influence matrix estimator 126 provides an estimate of actual thruster angular and translational acceleration capabilities, which is referred to herein as estimated influence matrix 128. Estimated influence matrix 128 may also be referred to as the estimated influence matrix Bhat. Estimated influence matrix 128 is generated using vehicle state 112 from navigation subsystem 110 and by using previous valve command outputs by the optimal thruster mixer 120. A gradient estimator may be used to update the initial estimated influence matrix. In different advantageous embodiments, other types of estimators may be used. The valve commands may be delayed to account for predicted thruster time delays and multiplied by the current estimated influence matrix to produce estimates of delayed vehicle translational and angular accelerations.

Performance and sensor subsystem 154 comprises thruster performance data, as well as, any additional thruster sensor measurements available. Computed thruster performance data may include propellant consumption, thruster on-times, thruster duty cycles, thruster pulse frequencies, as well as other data. Sensor data may include temperature measurements, tank or line pressure measurements, and possibly other measurements. The data may be filtered or processed over specified time intervals.

Health monitoring subsystem 140 provides the capability to autonomously identify and adapt to changes in vehicle mass properties, thruster alignment errors, thrust scale factor errors, and thruster failures. Health data 176 of platform 144 plurality of thrusters 158 is available to mission management subsystem 102 to re-configure mission objectives, such as objective functions 104, and to coordinate with other systems. Health monitoring subsystem 140 may maintain number of health parameters 188 within desired level 190.

Predicted influence matrix 130 is generated by health monitoring subsystem 140 based on a measured thruster locations, orientations, thrust levels and using in flight estimates of the vehicle mass, inertias and center-of-gravity based on a priori computed mass properties data and propellant consumption. Predicted influence matrix 130 may also be referred to herein as predicted B matrix and predicted influence matrix Bpred.

Diagnostics and prognostics unit 142 manages system life by proactively identifying and adapting to contingencies and failures. Diagnostics and prognostics unit 142 comprises health data 176. Health data 176 comprises diagnostic data 178 and prognostic data 180. In different advantageous embodiments, health data 176 may comprise other types of data.

Diagnostics and prognostics unit 142 provides diagnostic data 178 by comparing predicted influence matrix 130, which may be computed based on a priori mass properties, thruster data, and propellant consumption with estimated influence matrix 128, which is based on initial predicted influence matrix 130, vehicle state 112, and control system command history. A difference between estimated influence matrix 128 and predicted influence matrix 130 may be used to quantify inconsistencies 146 in thruster alignment, thrust scale factor, and dispersions in the vehicle mass properties. Inconsistencies 146 of thruster scale factors are compared with user-defined thresholds to indicate low and high thrust and thruster types of inconsistencies 146.

Diagnostics and prognostics unit 142 may also use prognostic data 180 from performance and sensor processing subsystem 154 to increase thruster, vehicle, or mission life. Prognostic data 180 may comprise usage and stress data for plurality of thrusters 158. The usage and stress data may comprise of thruster propellant consumption, thruster duty cycles, thruster on-times, pulse frequencies, as well as other data. The thruster sensor data may be comprised of thermal characteristics, tank or line pressure data as well as other data. Some thrusters from plurality of thrusters 158 may be inhibited or de-emphasized with a simple change to gain matrix 196 and the algorithm will generate the valve commands using the remaining thrusters from plurality of thrusters 158. Mission management subsystem 102 may be informed of inconsistencies 146 of the thrusters and mission objectives may be modified based on inconsistencies 146 of thrusters.

Platform 144 may have inconsistencies 146. Inconsistencies 146 may be, for example, non-operating thruster, low thruster, high thruster, change in mass of platform 144, and/or a change in the distribution of mass in platform 144. Inconsistencies 146 may be detected by performance and sensor subsystem 154, influence matrix estimator 126, and/or health monitoring subsystem 140. A low thruster may be when a thruster, such as thruster 148 operates at less than a desired output level. A high thruster may be when a thruster, such as thruster 148 operates at more than a desired output level.

For example, thruster 148 may be set to fully on and operating at full capacity. However, thruster may only operate at half of full capacity. In a half capacity situation, thruster 148 may be a low thruster. Change in mass of platform 144 and change in distribution of mass of platform 144 may occur by, but are not limited to, large uncertainties in predicted mass properties, unexpected propellant tank usage, mission anomalies, or breakage.

Mission management subsystem 102 may be notified of inconsistencies 146 in response to identifying inconsistencies 146 with platform 144. Notifying is done by the health monitoring subsystem 140. Health monitoring subsystem 140 notifies mission management subsystem 102 by submitting diagnostic data 178 and prognostic data 180 to mission management subsystem 102. Diagnostic data 178 may comprise the quality of influence matrix estimator 126 output and adaptation, inconsistencies 148 in plurality of thrusters 158 and/or platform 144, and thruster misalignment angles. Prognostic data 180 may comprise thruster usage and sensor data exceeding limits. In different advantageous embodiments, it may be desirable to limit thruster on-times, de-emphasize thrusters in the mixer, or inhibit thrusters to extend mission life.

In different advantageous embodiments, computer program product 150 may contain instructions used to implement thruster control system 146. Computer program product 150 may be associated with memory 152.

Memory 152 may be any type of computer data storage. Memory 152 may be, but not limited to, random access memory and/or controller cache memory. Processor cache memory is memory 152 located on a controller.

The illustration of thruster control environment 100 in FIG. 1 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, mission management subsystem 102 may be combined with guidance subsystem 106. Also, for example, performance and sensor subsystem 154 may be combined with navigation subsystem 110.

Figure 2:
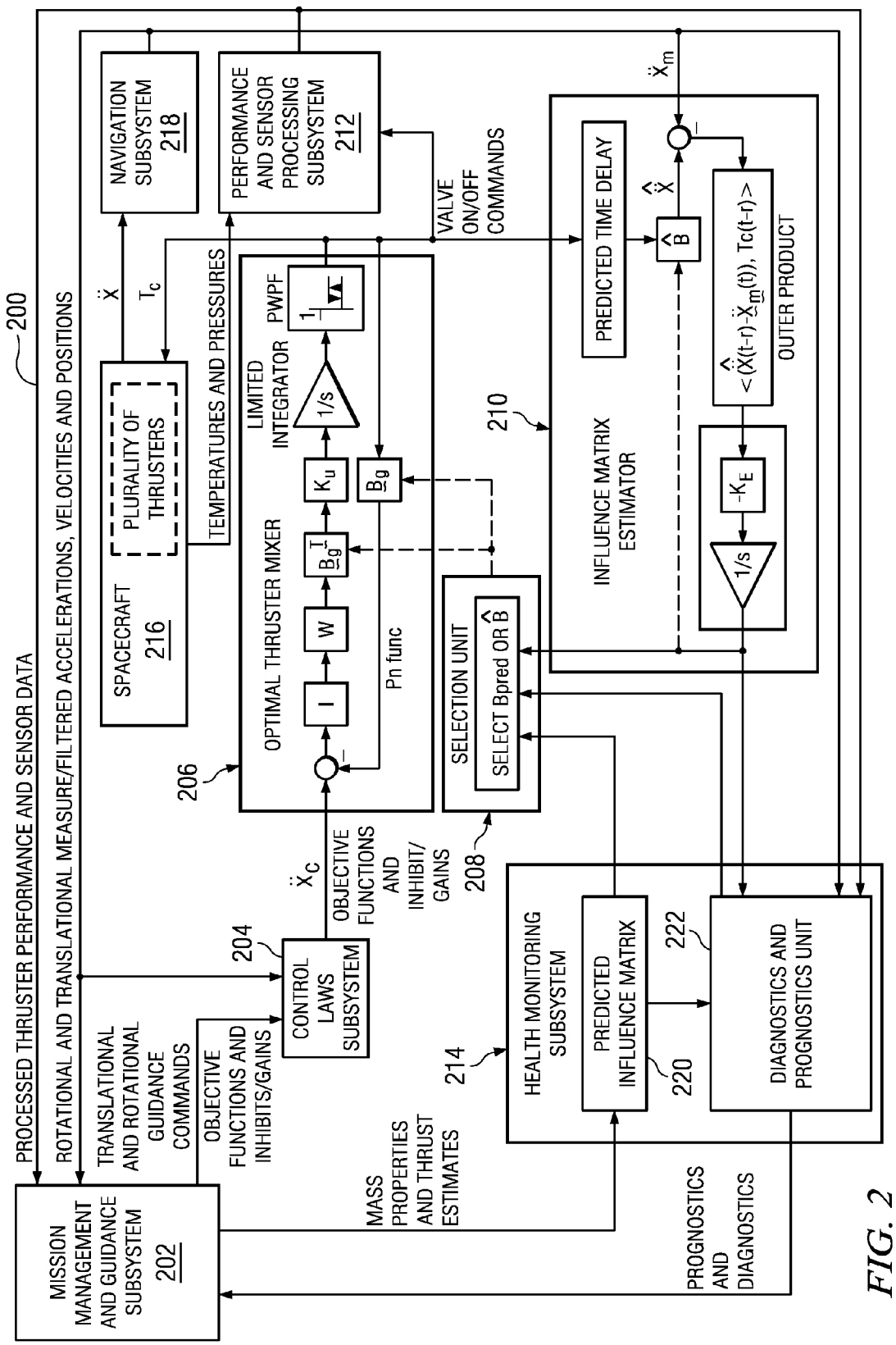
FIG. 2 is an illustration of a block diagram of a health-adaptive reaction control system depicted in accordance with an advantageous embodiment.

With respect to FIG. 2, a block diagram of a health-adaptive reaction control system is depicted in accordance with an advantageous embodiment. Health-adaptive reaction control system 200 may be one implementation of thruster control system 146 of FIG. 1. Health-optimal adaptive reaction control system 200 comprises mission management and guidance subsystem 202, control laws subsystem 204, optimal thruster mixer 206, selection unit 208, influence matrix estimator 210, performance and sensor processing subsystem 212, health monitoring subsystem 214, spacecraft 216, and navigation subsystem 218. Health monitoring subsystem 214 comprises a predicted influence matrix 220 and diagnostics and prognostics unit 222.

Mission management and guidance subsystem 202 may be one implementation of a combination of mission management subsystem 102 and guidance subsystem 106 of FIG. 1. Control laws subsystem 204 may be one implementation of control laws 114 of FIG. 1. Optimal thruster mixer 206 may be one implementation of optimal thruster mixer 120 of FIG. 1. Selection unit 208 may be one implementation of selection unit 124 of FIG. 1. Influence matrix estimator 210 may be one implementation of influence matrix estimator 126 of FIG. 1. Performance and sensor processing subsystem 212 may be one implementation of optimal thruster performance and sensor processing subsystem 154 of FIG. 1. Health monitoring subsystem 214 may be one implementation of health monitoring subsystem 140 of FIG. 1. Spacecraft 216 may be one implementation of platform 144 of FIG. 1. Navigation subsystem 218 may be one implementation of navigation subsystem 110 of FIG. 1.

Optimal thruster mixer 206 may begin by taking the difference of the n number of rotational and/or translational acceleration desired vehicle response commands generated by the linear control laws with the feedback of the vehicle response to produce acceleration errors or an objective function error vector. A feedback response vector is generated by multiplying the n×m control influence matrix Bg times the previous valve commands vector $T_c$ of length m. The objective function errors are weighted based on mission requirements by multiplying the errors by the n×n weighting matrix W.

The weighted errors are multiplied by the transpose of the control influence matrix $Bg^T$ to generate m number of signals, where m equals the number of thrusters. These signals are multiplied by the m×m diagonal matrix Ku to generate inputs to m pulse-width pulse-frequency integrators. The weighting gains Ku are chosen so that the thruster on-time commands will be greater than or equal to the minimum on-time capabilities of the thrusters. The weighting gains Ku may also be used to de-emphasize or inhibit a thruster. The lower bounds of the integrators are set equal to zero and the upper bounds are set equal to the upper bounds of pulse-width pulse-frequency Schmidt triggers. The integrator outputs are the inputs to n number of pulse-width pulse-frequency Schmidt triggers.

The Schmidt trigger is a switching function that is monotonic along its hysteresis path. If the output of an integrator exceeds the upper limit of the pulse-width pulse-frequency Schmidt trigger the thruster is commanded on. The thruster remains on until the integrated error signal drops below the lower limit of the Schmidt trigger. The selection of the control influence matrix Bg as gains in the regulator, the application of weighting matrix W, and bounded integrator and pulse-width pulse-frequency trigger levels, produces a weighted and constrained pseudo-inverse or P2-norm regulator in the modulation sense. The control influence matrix Bg can either be set to the predicted influence matrix Bpred which is computed based on a priori thruster characteristics and estimated mass properties or it can be set to the estimated influence matrix Bhat which is computed based on thruster valve command histories and the sensed and/or measured response of the vehicle.

The pulse-width pulse-frequency modulator is implemented by combining the regulator and integrator with a Schmidt trigger. The integrator and pulse-width pulse-frequency trigger limits constrain the optimization to only generate physically realizable thruster on-off commands. The modulation factor is defined as the ratio of thruster (on time)/(on time+off time) for an interval of interest. The interval of interest is significantly greater than the minimum pulse width, but not of the order of the time constants of the system dynamics being controlled. The thruster modulation factors are independent from each other. A number of advantageous embodiments recognize that using pulse-width pulse-frequency modulation the modulation factor to be linear with the input level and thruster minimum on-times may be specified by the appropriate selection of the Ku regulator gains and pulse-width pulse-frequency Schmidt trigger limits.

In different advantageous embodiments, the weighting gains Ku and pulse-width pulse-frequency Schmidt trigger limits can be selected so that smaller, faster thrusters will fire first to remove errors, and then if necessary, slower thrusters will come on to reduce larger errors. A number of advantageous embodiments provide the capability for both high bandwidth control and large control authority.

In different advantageous embodiments, higher or lower P-norms may be used. For example, a pth-order norm can generated by placing the nonlinear function $Pn=sign(x_i)*abs[(x_i)^{p-1}]$ on the $x_i$ error signals prior to weighting matrix W. Note, for p=2, the Pn function is equivalent to the identity matrix. The general P-norm function minimizes the following norm of error vector x of length n:

$$\|x\|_p := \left( \sum_{i=1}^{n} |x_i|^p \right)^{\frac{1}{p}}.$$

Higher P-norms penalize larger errors more steeply and smaller errors more gradually; for very high P-norms a deadzone effect for small errors may be generated where small errors are not penalized. Lower p-norms (1<p<2) may be used.

Selection unit 208 allows optimal thruster mixer 406 to select an estimated influence matrix Bhat or a predicted influence matrix Bpred to use in optimal thruster mixer 206. In selection unit 208 where the optimal thruster mixer 206 can adapt to vehicle and thruster dispersions and to thruster failures, the gain matrix Bg is set equal to the estimated influence matrix Bhat. If the quality of the estimated influence matrix Bhat becomes invalid, the predicted influence matrix Bpred is used as the gain matrix. The gain matrix Bg may also be set to a previous valid estimated influence matrix when a current estimated influence matrix is not valid. The estimated influence matrix Bhat is invalid when root mean square errors between the delayed estimated accelerations and measured accelerations exceed specified parameters.

An initial estimated influence matrix may be set equal to the predicted influence matrix. The predicted influence matrix is computed using a priori thruster and vehicle mass properties data. The delayed estimated accelerations are differenced with the navigation data produced by navigation subsystem 218 to generate acceleration errors. The outer product of the delayed valve commands and the acceleration errors is multiplied by a gain $-K_E$ to produce a rate of change of estimated influence matrix at the matrix element level. The gain $-K_E$ is selected so that the estimated influence matrix converges fast enough to track changes in the vehicle and thruster characteristics, but slow enough not to excite dynamics in the controlled system. These rates are integrated on an element by element basis to update to a new estimate of the influence matrix, such as the current estimated influence matrix. In different advantageous embodiments, the estimated influence matrix is a gain matrix in optimal thruster mixer 206 for health-based adaptation. Thus, as thruster characteristics or mass properties change, weighting adjustments in the thruster selection process occur automatically.

The block diagrams in FIGS. 1-2 illustrate the architecture, functionality, and operation of a possible implementation of apparatus and methods of different advantageous embodiments. The block diagrams may represent a module, segment, function, and/or a portion of an operation or step. In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved.

For example, mission management subsystem 102 and guidance subsystem 106 of FIG. 1 may be combined to be a single subsystem.

Figure 3:
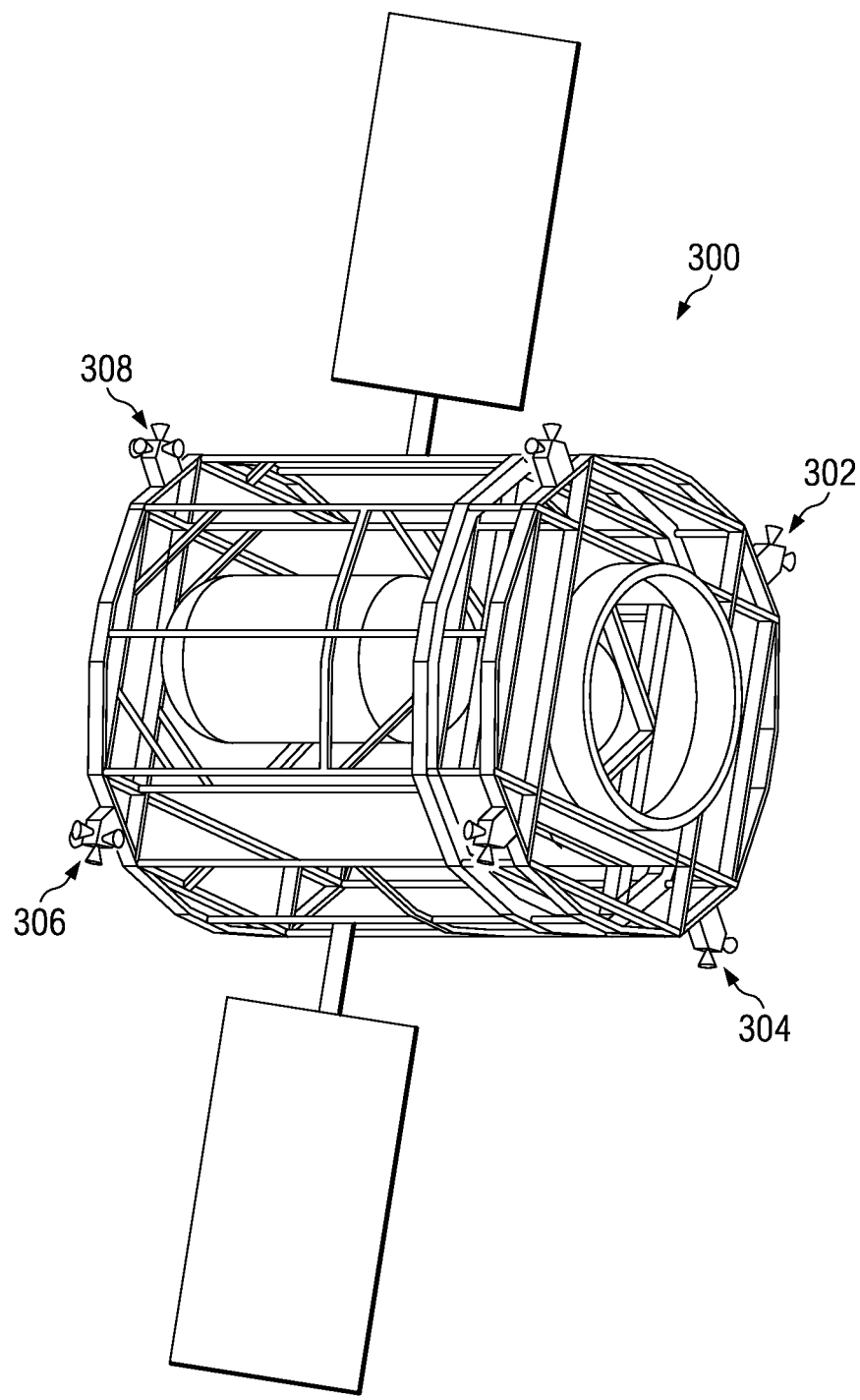
FIG. 3 is a diagram of a spacecraft depicted in accordance with an advantageous embodiment.

Turning now to FIG. 3, a diagram of a spacecraft is depicted in accordance with an advantageous embodiment. In one advantageous embodiment, spacecraft 300 comprises thrusters 302, 304, 306, and 308. Thrusters 302, 304, 306, and 308 may not be the only thrusters on spacecraft 300, but only illustrative embodiments of some of the thrusters on spacecraft 300. Spacecraft 300 may be one implementation of spacecraft 800 of FIG. 8, platform 144 of FIG. 1, and/or spacecraft 416 of FIG. 4. Thrusters 302, 304, 306, and 308 may be one implementation of thruster 148, thruster 166, plurality of thrusters 158, and/or combination of thrusters 144.

Figure 4:
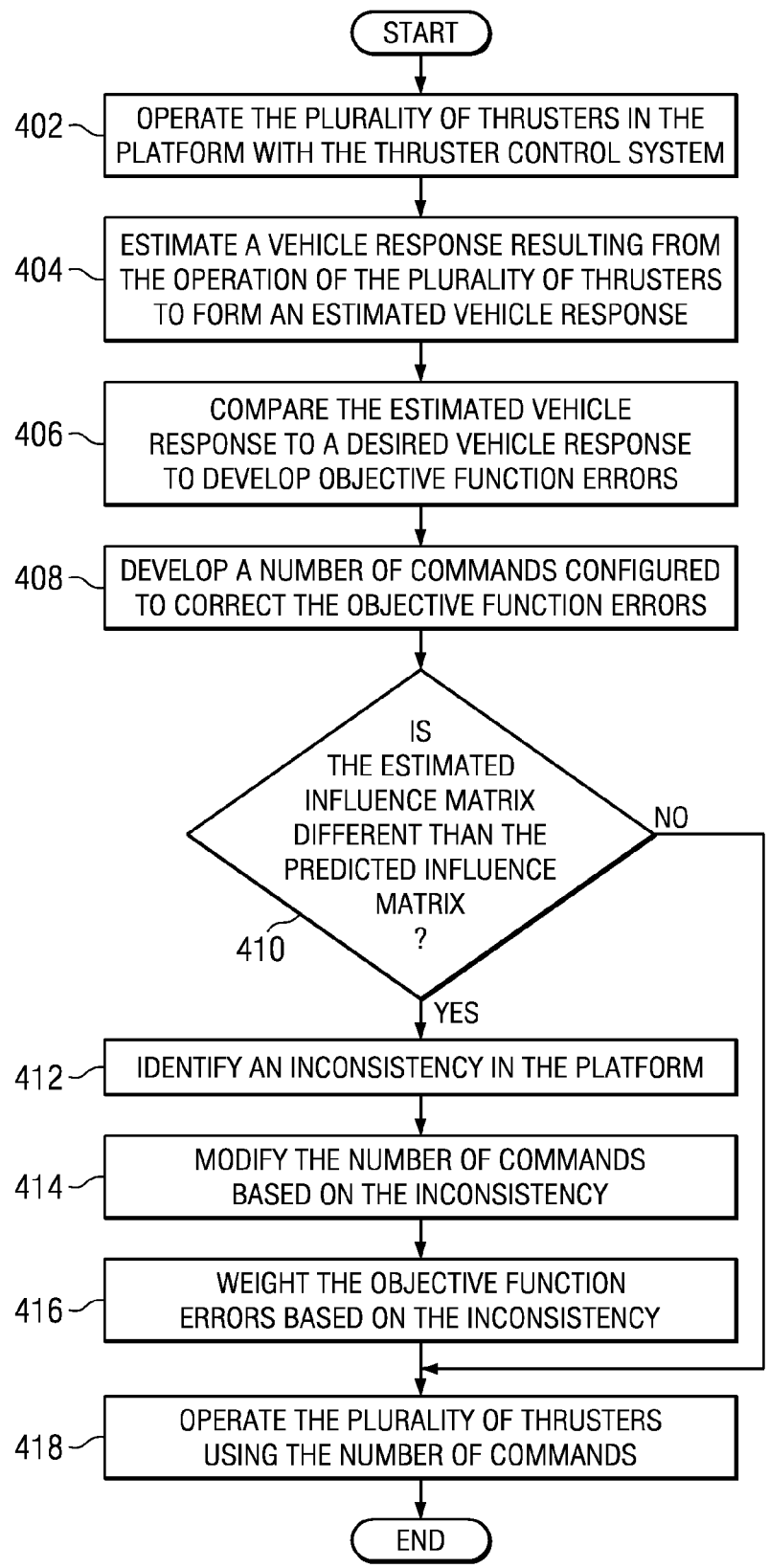
FIG. 4 is a flowchart of a process for managing a plurality of thrusters in a platform depicted in accordance with an advantageous embodiment.

With respect to FIG. 4, a flowchart depicting a process for managing a plurality of thrusters in a platform. The process begins by operating the plurality of thrusters in the platform with a thruster control system (step 402). The process then estimates a vehicle response resulting from the operation of the plurality of thrusters to from an estimated vehicle response (step 404). Next, the process compares the estimated vehicle response to a desired vehicle response to develop objective function errors (step 406). Then, the process develops a number of commands configured to correct the objective function errors (step 408). Developing the number of commands may comprise weighting each thruster in the plurality of thrusters and/or weighting the objective function errors. Developing the number of commands may also comprise using one of an estimated influence matrix or a predicted influence matrix as a gain matrix on the objective function errors. Determine whether the estimated influence matrix being different than the predicted influence matrix (step 410). If the estimated influence matrix is not different than the predicted influence matrix, then proceed to step 418. If the estimated influence matrix is different than the predicted influence matrix, identify an inconsistency in the platform (step 412). Then, the process modifies the number of commands based on the inconsistency (step 414). Next, the process weights the objective function errors based on the inconsistency (step 416). Finally, the process operates the plurality of thrusters using the number of commands (step 418). Thereafter, the process terminates.

Additionally, in different advantageous embodiments, developing the number of commands may further comprise quantifying errors between estimated influence matrix and the predicted influence matrix. Diagnostic and prognostic data is generated based on the errors. If the errors exceed certain levels an inconsistency may be identified. The inconsistency may be due to dispersions in vehicle mass properties or may also be in any thruster of the plurality of thrusters. A number of commands may be modified based on the inconsistency. For example, if one of the thrusters of the plurality of thrusters has failed, The number of commands associated with the weighting on that thruster would be set to zero to take into account that the failed thruster is no longer available.

Additionally, in different advantageous embodiments, developing the number of commands may further comprise the process making a determination whether the difference between the estimated vehicle response and the vehicle response is greater than a specified parameter. If the difference between the estimated vehicle response and the vehicle response is greater than a specified parameter, the process selects at least one of a predicted influence matrix or a last valid estimated influence matrix to use in the number of commands. However, if the difference between the estimated vehicle response and the vehicle response is less than a specified parameter, the process selects an estimated influence matrix to use in the number of commands.

Figure 5:
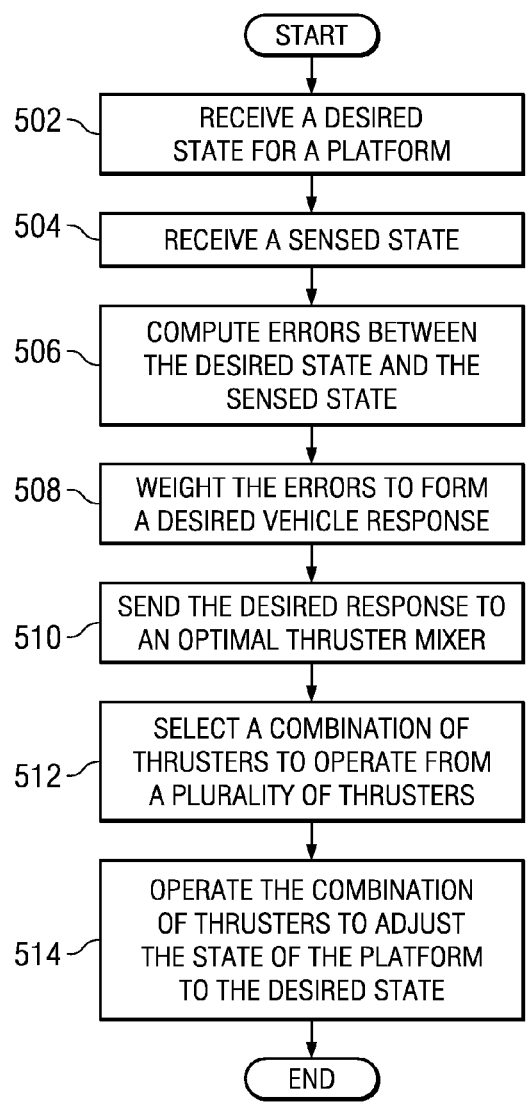
FIG. 5 is a flowchart of a process for controlling a vehicle state of a platform depicted in accordance with an advantageous embodiment.

With respect to FIG. 5, a flowchart depicting a process for controlling a vehicle state of a platform. The process begins by receiving a desired state for a platform (step 502). Also, the process receives a sensed state (step 504). The process computes errors between the desired state and the sensed state (step 506). The process weights the errors to form a desired vehicle response (step 508). Then, the process sends the desired vehicle response to an optimal thruster mixer (step 510). The process selects a combination of thrusters to operate from a plurality of thrusters (step 512). The combination of thrusters is selected to adjust the state of the platform to the desired state. Then, the process operates the combination of thrusters to adjust the state of the platform to the desired state (step 514). Thereafter, the process terminates.

Figure 6:
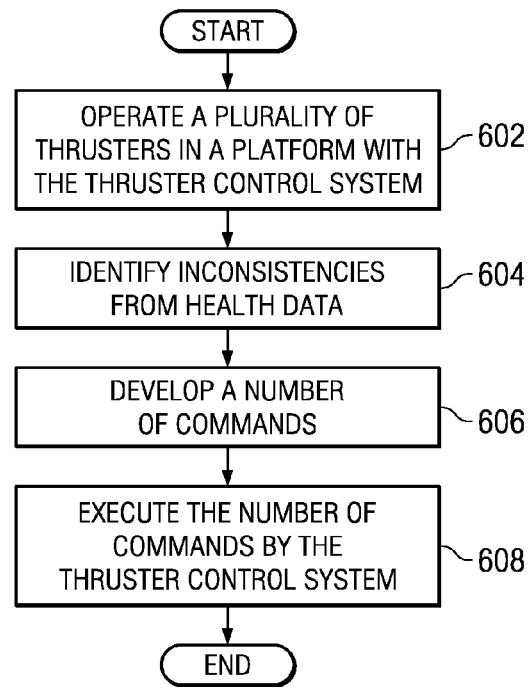
FIG. 6 is a flowchart of a process for maintaining health parameters in a platform depicted in accordance with an advantageous embodiment.

With respect to FIG. 6, a flowchart depicting a process for maintaining health parameters in a platform. The process begins by operating a plurality of thrusters in the platform with a thruster control system (step 602). The process then identifies inconsistencies from health data (step 604). The inconsistencies may be based on differences in an estimated influence matrix and a predicted influence matrix. Next, the process develops a number of commands (step 606). The number of commands are configured to maintain a number of health parameters for the platform within a desired level using health data. The number of commands may be weighting objective functions, selecting different objective functions, and/or weighting each thruster of a plurality of thrusters. The number of commands may also be weighting matrices and Schmidt trigger parameters. In different advantageous embodiments, the number of commands may also be comprised of retarget data or an emergency operation response. The health data may comprise diagnostic data and prognostic data. Next, the process executes the number of commands by a thruster control system (step 608). Thereafter, the process terminates.

The different advantageous embodiments provide P-norm error optimal thruster selection, for both rotational and translational control, and output valve commands to a plurality of available thrusters on a spacecraft. The different advantageous embodiments integrate vehicle health data with optimal thruster allocation to provide the best available thruster control system response to assure both vehicle health and mission success.

A number of different advantageous embodiments provide increased flexibility. For example, multi-axis and a combined rotation and translation control, operation without pre-made mixing tables, utilization of any number of thrusters, utilization of thrusters of different types, and low computational requirements.

A number of different advantageous embodiments provide using linear control laws and a health management system to maximize thruster, vehicle, and mission life.

A number of different advantageous embodiments provide a multi-axis weighted, constrained, p-norm, optimal thruster selection, with combined rotational and translation control that provides the capability to minimize and relatively weight the importance of per axis translational and rotational errors, reaction control system propellant consumption, and structural mode excitation due to thrusters. The number of different advantageous embodiments provide the use of a regulator formulation that does not involve solution iterations and requires relatively low computational throughput.

A number of different advantageous embodiments integrate a P2-norm formulation of a regulator with pulse-width pulse-frequency modulation so that linear control laws can be used to control nonlinear on-off thrusters. The P2-norm formulation results in much simpler and quicker development of control laws and validation. Additionally, placement of pulse-width pulse-frequency modulation inside the optimal thruster mixer means that optimization is constrained by the pulse-width pulse-frequency bounds to produce realizable on-off valve commands. The embodiments also adapt to dispersions in mass properties, such as but not limited to, mass, inertia, and center of gravity, and thruster properties, such as but not limited to, scale factor and alignment. Additionally, the advantageous embodiments provide autonomous and optimal thruster selection with failures and provides capability to fully utilize all available thrusters and thrusters of different types or sizes.

A number of different advantageous embodiments provide diagnostic and prognostic thruster health data to mission management subsystem to support optimal mission response to inconsistencies or anomalies and capability to extend life of vehicle. The inconsistencies and anomalies may comprise thruster failures, thruster alignment and scale factor errors, thruster propellant consumption, duty cycles, pulse frequencies and any thruster sensor data available.

A number of different advantageous embodiments provide the structure and capability to use diagnostic and prognostic data to autonomously change objective function and weighting of objective functions or weighting of thrusters in optimal selection algorithm to meet performance requirements and maintain vehicle health and extend life of vehicle. Some illustrative examples include, but are not limited to, the following:

Failed thrusters may be removed from optimal thruster mixer. The thruster control system optimally selects a thruster combination to remove errors with remaining thrusters. The thruster control system informs the mission management subsystem of failures.

If there is an increase of the weight on propellant consumption in optimal thruster selection algorithm, the thruster control system may choose thrusters to decrease propellant consumption. The propellant consumption may be decreased at the expense of performance error.

If there is a temperature of a thruster above a desired threshold for some interval of time, the thruster control system may limit the on-time of the thruster to extend the life of the thruster. Additionally, if the on-time exceeds the desired temperature threshold, the thruster control system may remove the thruster from the optimal thruster mixer. The thruster control system may select thrusters out of the remaining thrusters to correct attitude errors. The thruster control system may also reduce weight on the thrusters with a temperature above the desired threshold while removing errors.

If there is an excessive duty cycle on thruster, the thruster control system may reduce weight on the thruster and select other thrusters when possible to minimize errors.

If there is a low or high thrust level identified on a thruster, the thruster control system may inhibit or reduce weight on the thruster. The thruster control system may then select other thrusters when possible to reduce errors. If the low or high level thruster is not inhibited or weight reduced, optimal thruster mixer will take the low or high thrust level into account to choose a thruster combination. Thruster control system may notify the mission management subsystem of scale factor errors.

If there is an excessive structural mode excitation, a stability issue and may cause the structure to break or fatigue, the thruster control system may weight and select thruster to reduce structural mode excitation. In some advantageous embodiments, the thrusters are selected and weighted at the expense of performance error.

If there are thruster alignment errors, the thruster control system may notify the mission management subsystem and ground station of the alignment errors. The optimal thruster mixer may adapt to the misaligned orientation of thrusters and develop a multi-axis thruster selection and weighting with the actual alignments. The quality of the adaptation may be continuously verified against measured data. If the adaptive capability becomes invalid, the thruster control system will switch to using pre-computed data or the last valid estimated data.

Figure 7:
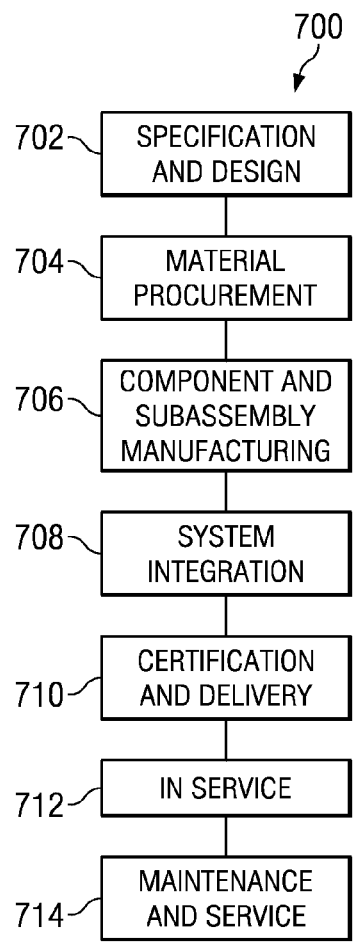
FIG. 7 is an illustration of a spacecraft manufacturing and service method in accordance with an advantageous embodiment.

Referring to FIG. 7, an illustration of a spacecraft manufacturing and service method is depicted in accordance with an advantageous embodiment. During pre-production, illustrative spacecraft manufacturing and service method 700 may include specification and design 702 of spacecraft 800 in FIG. 8 and material procurement 704.

During production, component and subassembly manufacturing 806 and system integration 708 of spacecraft 800 in FIG. 8 takes place. Thereafter, spacecraft 800 in FIG. 8 may go through certification and delivery 710 in order to be placed in service 712. While in service by a customer, spacecraft 800 in FIG. 8 is scheduled for routine maintenance and service 714, which may include modification, reconfiguration, refurbishment, and other maintenance or service.

Each of the processes of spacecraft manufacturing and service method 700 may be performed or carried out by a system integrator, a third party, and/or an operator. In these examples, the operator may be a customer. For the purposes of this description, a system integrator may include, without limitation, any number of spacecraft manufacturers and major-system subcontractors; a third party may include, without limitation, any number of venders, subcontractors, and suppliers; and an operator may be an airline, leasing company, military entity, service organization, and so on.

With reference now to FIG. 8, an illustration of a spacecraft is depicted in which an advantageous embodiment may be implemented. In this example, spacecraft 800 is produced by spacecraft manufacturing and service method 700 in FIG. 7 and may include frame 802 with systems 804 and interior 806. Examples of systems 804 include one or more of thruster control system 816, propulsion system 818, electrical system 810, hydraulic system 812, environmental system 814, and guidance system 820. Any number of other systems may be included.

In one advantageous embodiment, spacecraft 800 is configured with twenty-four thrusters. Spacecraft 800 may take different forms in different advantageous embodiments, such as, for example, a satellite, shuttle, rocket, and/or planetary lander. Although an aerospace example is shown, different advantageous embodiments may be applied to other industries, such as the automotive industry.

Apparatus and methods embodied herein may be employed during any one or more of the stages of spacecraft manufacturing and service method 700 in FIG. 7. For example, components or subassemblies produced in component and subassembly manufacturing 706 in FIG. 7 may be fabricated or manufactured in a manner similar to components or subassemblies produced while spacecraft 800 of FIG. 8 is in service 712 in FIG. 7.

Also, one or more apparatus embodiments, method embodiments, or a combination thereof may be utilized during production stages, such as component and subassembly manufacturing 706 and system integration 708 in FIG. 7, for example, without limitation, by substantially expediting the assembly of, or reducing the cost of, spacecraft 200. Similarly, one or more of apparatus embodiments, method embodiments, or a combination thereof may be utilized while spacecraft 200 is in service 712 or during maintenance and service 714 in FIG. 7.

As another example, one or more of the different advantageous embodiments may be used to manufacture parts for use in spacecraft 200 during component and subassembly manufacturing 706 and/or maintenance and service 714.

The description of the different advantageous embodiments has been presented for the purpose of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

Although the different advantageous embodiments have been described with respect to parts for a spacecraft, other advantageous embodiments may be applied to parts for other types of platforms. For example, without limitation, other advantageous embodiments may be applied to a mobile platform or a stationary platform. Also, different advantageous embodiments may provide support for other applications for a thruster control system on/off control laws, such as velocity, trajectory, vehicle spacing, emission control, imaging control, temperature control, service control, maintenance control, motor control, and switching magnetic fields.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for controlling a state of a platform, the method comprising:
   receiving a desired state for the platform;
   receiving a state of the platform;
   selecting a combination of thrusters from a plurality of thrusters to operate, the combination of thrusters selected to adjust the state of the platform to the desired state; and
   operating the combination of thrusters to adjust the state of the platform to the desired state; wherein operating the combination of thrusters comprises:
   estimating, by a processor control unit, a response to the platform resulting from the operation of the plurality of thrusters to form an estimated platform response;
   comparing, by the processor control unit, the estimated platform response to the desired state for the platform response to develop objective function errors;
   selecting, by the processor control unit, one of an estimated influence matrix or a predicted influence matrix, wherein the estimated influence matrix is generated using the state of the platform and previous valve command outputs, and wherein the predicted influence matrix is generated from in-flight estimates of thruster characteristics of the platform;
   developing, by the processor control unit, a number of commands configured to correct the objective function errors based on one of the estimated influence matrix or the predicted influence matrix; and
   operating the combination of thrusters using the number of commands.

2. The method of claim 1, further comprising:
   weighting the objective function errors to form a desired platform response.

3. The method of claim 2, further comprising:
   sending the desired platform response to an optimal thruster mixer to correct the state of the platform.

4. The method of claim 3, wherein the optimal thruster mixer modifies the desired platform response.

5. A method for maintaining a number of health parameters in a platform, the method comprising:
   operating a plurality of thrusters in the platform with a thruster control system;
   estimating, by a processor control unit, a response to the platform resulting from the operation of the plurality of thrusters to form an estimated platform response;
   comparing, by the processor control unit, the estimated platform response to a desired state for the platform response to develop objective function errors;
   selecting, by the processor control unit, one of an estimated influence matrix or a predicted influence matrix, wherein the estimated influence matrix is generated using the state of the platform and previous valve command outputs, and wherein the predicted influence matrix is generated from in-flight estimates of thruster characteristics of the platform;
   developing, by the processor control unit, a number of commands, the number of commands configured to maintain the number of health parameters for the platform within a desired level using health data and correct the objective function errors based on one of the estimated influence matrix or the predicted influence matrix; and
   operating the plurality of thrusters with the thruster control system using the number of commands.

6. The method of claim 5, wherein developing the number of commands further comprises:
   weighting objective functions.

7. The method of claim 5, wherein developing the number of commands further comprises:
   weighting the plurality of thrusters.

8. The method of claim 5, wherein developing the number of commands further comprises:
   selecting objective functions.

9. The method of claim 5, wherein the health data comprises diagnostic data and prognostic data.

10. The method of claim 9, further comprising:
    notifying a mission management subsystem of the prognostic data and the diagnostic data.

11. The method of claim 5, further comprising:
identifying inconsistencies from the health data, wherein the inconsistencies are based on differences in the estimated influence matrix and the predicted influence matrix.

12. An apparatus comprising:
a thruster control system on a platform; and
a processor unit configured to:
receive a desired state for the platform;
receive a state of the platform;
select a combination of thrusters from a plurality of thrusters to operate, the combination of thrusters selected to adjust the state of the platform to the desired state; and operate the combination of thrusters to adjust the state of the platform to the desired state, wherein the processor unit is further configured to;
estimate a response to the platform resulting from the operation of the plurality of thrusters to form an estimated platform response;
compare the estimated platform response to the desired state for the platform response to develop objective function errors;
select one of an estimated influence matrix or a predicted influence matrix, wherein the estimated influence matrix is generated using the state of the platform and previous valve command outputs, and wherein the predicted influence matrix is generated from in-flight estimates of thruster characteristics of the platform;
develop a number of commands configured to correct the objective function errors based on one of the estimated influence matrix or the predicted influence matrix; and
operate the combination of thrusters with the thruster control system using the number of commands.

13. The apparatus of claim 12, further comprising the processor unit being configured to weight the objective function errors to form a desired platform response.

14. The apparatus of claim 13, further comprising the processor unit being configured to send the desired platform response to an optimal thruster mixer to correct the state of the platform.

15. The apparatus of claim 13, wherein an optimal thruster mixer modifies the desired platform response.

16. An apparatus comprising:
a thruster control system on a platform; and
a processor unit configured to:
receive a desired state for the platform;
receive a state of the platform;
select a combination of thrusters from a plurality of thrusters to operate, the combination of thrusters selected to adjust the state of the platform to the desired state; and
operate a plurality of thrusters in the platform with a thruster control system; wherein the processor unit is further configured to;
estimate a response to the platform resulting from the operation of the plurality of thrusters to form an estimated platform response;
compare the estimated platform response to the desired state for the platform response to develop objective function errors;
select one of an estimated influence matrix or a predicted influence matrix, wherein the estimated influence matrix is generated using the state of the platform and previous valve command outputs, and wherein the predicted influence matrix is generated from in-flight estimates of thruster characteristics of the platform;
develop a number of commands, the number of commands configured to maintain a number of health parameters for the platform within a desired level using health data and correct the objective function errors based on one of the estimated influence matrix or the predicted influence matrix; and;
operate the combination of thrusters with the thruster control system using the number of commands.

17. The apparatus of claim 16, wherein the processor unit developing the number of commands further comprises the processor unit being configured to weight objective functions.

18. The apparatus of claim 16, wherein the processor unit developing the number of commands further comprises the processor unit being configured to weight the plurality of thrusters.

19. The apparatus of claim 16, wherein the processor unit developing the number of commands further comprises the processor unit being configured to select objective functions.

20. The apparatus of claim 16, wherein the health data comprises diagnostic data and prognostic data.

21. The apparatus of claim 20, further comprising the processor unit being configured to notify a mission management subsystem of the prognostic data and the diagnostic data.

22. The apparatus of claim 16, further comprising the processor unit being configured to identify inconsistencies from the health data, wherein the inconsistencies are based on differences in the estimated influence matrix and the predicted influence matrix.

* * * * *